Figure 1:
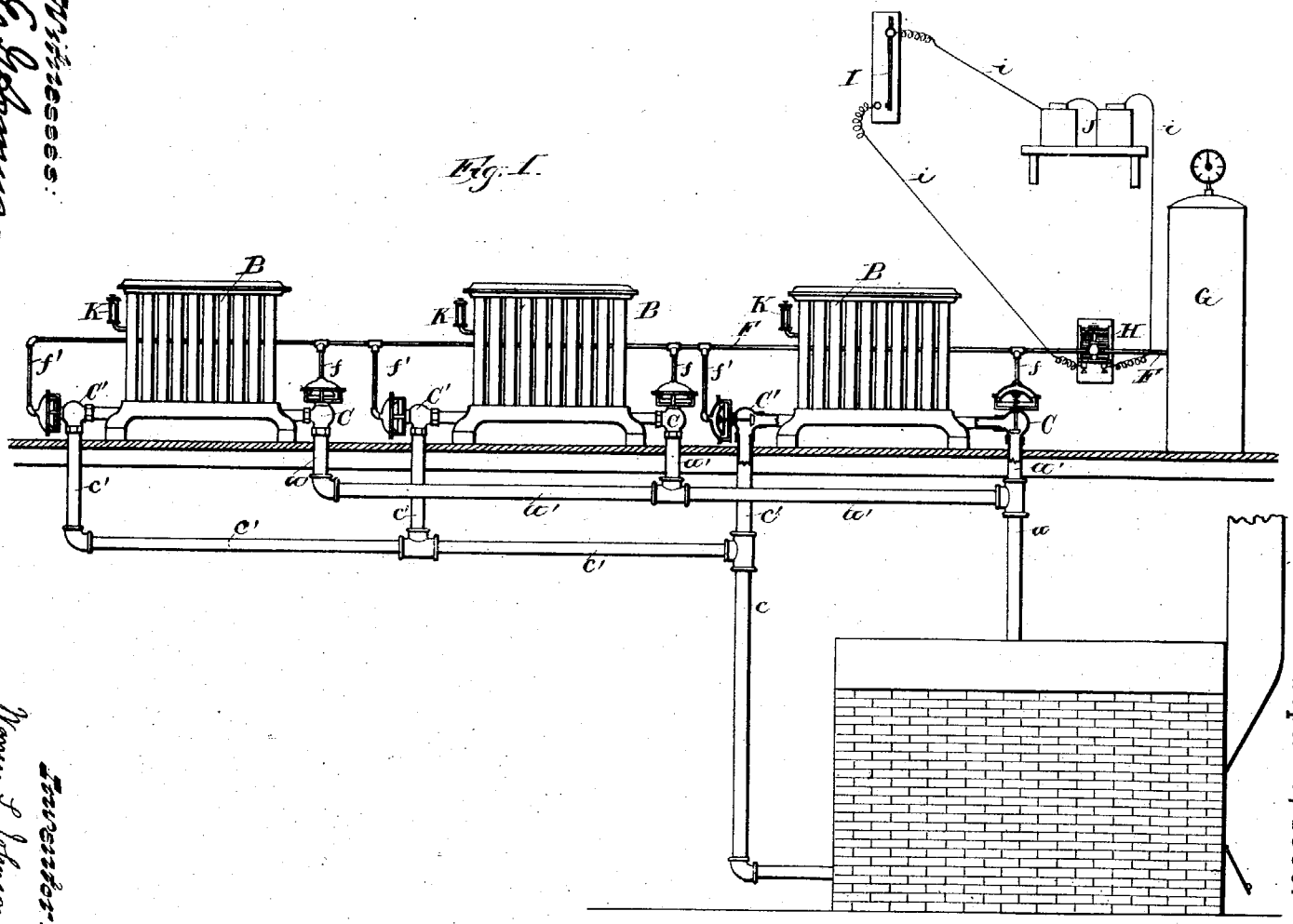

W. S. JOHNSON.

Assignor to the JOHNSON ELECTRIC SERVICE COMPANY.

SYSTEM OF TEMPERATURE REGULATION.

No. 10,768. Reissued Sept. 28, 1886.

Witnesses:
E. G. Somes
Maurice F. Frear.

Inventor:
Warren S. Johnson
By Stout & Underwood
Attorneys.

2 Sheets—Sheet 2.
W. S. JOHNSON.
Assignor to the JOHNSON ELECTRIC SERVICE COMPANY.
SYSTEM OF TEMPERATURE REGULATION.
No. 10,768. Reissued Sept. 28, 1886.
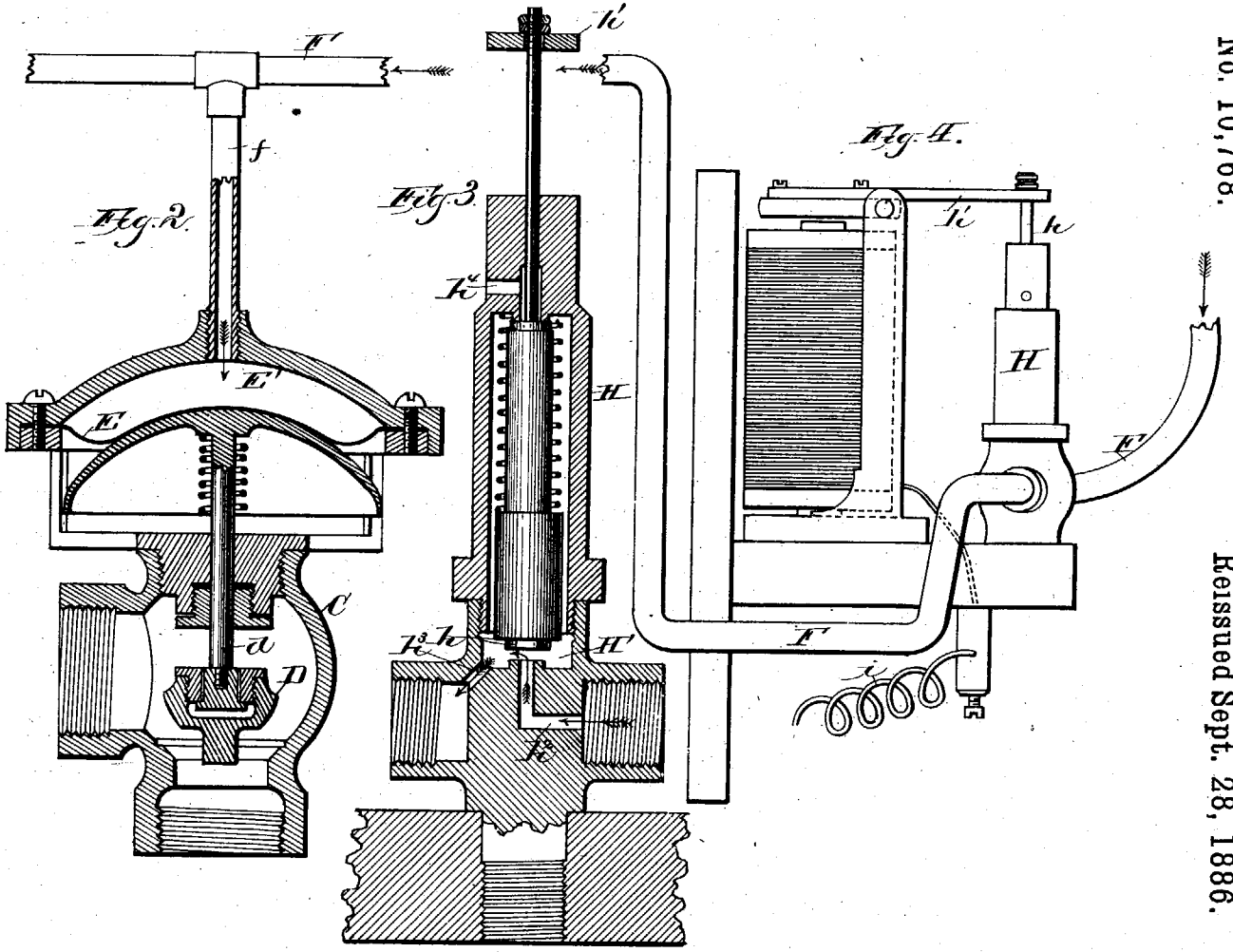
Witnesses:
E. G. Somers
Maurice F. Frear.
Inventor:
Warren S. Johnson
By Stout & Underwood
Attorneys.

UNITED STATES PATENT OFFICE.

WARREN S. JOHNSON, OF MILWAUKEE, WISCONSIN, ASSIGNOR TO THE JOHNSON ELECTRIC SERVICE COMPANY, OF SAME PLACE.

SYSTEM OF TEMPERATURE-REGULATION.

SPECIFICATION forming part of Reissued Letters Patent No. 10,768, dated September 28, 1886.

Original No. 331,406, dated December 1, 1885. Application for reissue filed September 4, 1886. Serial No. 212,753.

*To all whom it may concern:*

Be it known that I, WARREN S. JOHNSON, formerly of Whitewater, in the county of Walworth, and in the State of Wisconsin, but now of Milwaukee, in the county of Milwaukee and said State of Wisconsin, have invented certain new and useful Improvements in Systems of Temperature-Regulation; and I do hereby declare that the following is a full, clear, and exact description thereof.

My invention relates to that class of devices which regulate temperatures by automatically controlling the sources of heat, such as steam-pipes, hot-air flues, &c.; and it consists of a system of temperature-regulation, which will be more fully set forth hereinafter.

In the drawings, Figure 1 is a representation of a system of steam-heating with my system of automatic regulation combined therewith. Fig. 2 is a vertical section of one of my main diaphragm-valves. Fig. 3 is a detail sectional view, and Fig. 4 is a side elevation, of my electrically-actuated auxiliary valve which controls the admission of the fluid used to the expansible chambers of the diaphragm-valves.

My invention more directly relates to the system of controlling the source of heat by means of a thermostat which makes and breaks an electric current, the said electric current in turn operating a small valve which is connected with some fluid under pressure, such as steam, water, air, &c. As the current operates the small valve the fluid under pressure enters an expansible chamber, by the movement of whose walls the main valve is operated. The details of this system of controlling sources of heat automatically are fully set forth in a patent granted to me June 24, 1884, and numbered 301,059.

The present application relates to the adaptation of the various elements of my device to meet the requirements of certain forms of steam and hot-air heating.

A is a steam (or hot-air) generator, supposed to be placed in the basement of a building. The generator A has the supply-pipe *a*, with its divisions *a′ a′* leading to the coils or radiators B B B. It also has the return-pipe *c*, with its branches *c′ c′* leading from the radiators back to the generator A. Each of the coils or radiators B B is supplied with the supply-valve C and the return-valve C′, and these valves are of the construction shown in detail in Fig. 2, and substantially the same as shown and described in my patent for thermo-pneumatic temperature-regulator, granted March 17, 1885, and numbered 314,027. Each valve C and C′ has the valve-disk D, which serves to control the steam-passages *a′* and *c′* of the supply and return pipes, respectively, and each valve is also supplied with an expansible chamber, E′, having a movable wall or diaphragm, E. When the chamber E′ is expanded by means of the admission of a fluid under pressure, it pushes the valve D to its seat by means of its stem *d*. The expansible chambers E′ of each of the valves C C C and of the valves C′ C′ C′ are connected by the pipe F and its branches *f f f* and *f′ f′ f′*, respectively, to the reservoir, G, of fluid under pressure—as compressed air, tank of water, &c.—and between the reservoir G and the first valve C of the system is situated in the pipe F the electrically-actuated valve H, which serves to admit the air or other fluid to the expansible chambers of the main valves C C′, &c., or to release said air or other fluid therefrom. This auxiliary valve H is shown in detail in Figs. 3 and 4.

I is a thermostat situated in the apartment which the coils or radiators B B B are intended to heat. This thermostat is connected by the wires *i i i* with the electric battery J and the electrically-actuated valve H. This valve H consists of a chamber, H′, containing a piston-valve, *h*, which is lifted by the armature-lever *h′* when the electric circuit is made by the thermostat, and this permits the fluid from the reservoir G to enter the valve-chamber H′ from the pipe F through the passage $h^2$, and to pass out of said chamber through the passage $h^3$ into the pipe F on the other side of the valve H, and thus through the branches *f* into the expansible chambers E′ in the valves C C C, as hereinafter explained; and the said valve-chamber H′ has an outlet, $h^4$, at the top, which is closed by the upper end of the piston-valve $h$ when the passages $h^2$ H′ $h^3$ are open, as shown in Fig. 3. The particular location of the reservoir G and battery J is immaterial, and the pipe F may be bent in any way, as shown in Fig. 4, necessary to secure a convenient location for the auxiliary valve H.

The thermostat I serves, by changes of temperature, to make and break the electric circuit which operates the valve H, which in turn admits or releases the fluid under pressure to or from the expansible chambers E′ E′, &c., in the main valves. As the expansion and contraction of the said chambers operate the valves, it is evident that the making and breaking of the electric current by the thermostat I will control the supply of steam, and thus the temperature of the room.

My present invention essentially consists in so systematizing this manner of regulating temperatures that a single thermostat and electrically-actuated valve will control a great number of valves which govern the supply of heat to a room, and effectually exclude the source of heat from each part of the system. To accomplish the latter effect I have heretofore used check-valves on the return-pipes $c'$ $c'$ $c'$ of the coils or radiators B B B; but owing to the lack of reliability of action of check-valves, I have devised my present method of closing both the supply-valves C C C and the return-valves C′ C′ C′ automatically by fluid under pressure, thus effectually excluding the steam or other fluid which is the source of heat.

In placing the supply-valve C and the return-valve C′ on the pipes, I place them so that when they are closed the pressure in the supply-pipe $a'$ will tend to press against the under side of the valve disk D in the supply-valve C and open it, while the pressure in the return-pipe $c'$ will press against the upper side of the disk D in the return-valve C′ and tend to keep it closed. The reason of this arrangement is as follows: Each radiator is necessarily supplied with an air-valve, K, for when said radiator is for a longer or shorter period shut off from the steam system it will unavoidably be filled with air. When the steam is again admitted, if there is no escape for the air, the radiator will not be perfectly filled with steam. The air-valve K is so made that the air can escape; but when steam or hot water endeavors to pass through, it automatically closes by the expansion due to the heat, as is well known in ordinary air-valves of this kind. Now, if the valves C and C′ both opened at the same time, the steam would enter equally at both ends, and before the steam from the supply-pipe $a'$ had forced out the air from the air-valve K the steam or water from the return-pipe $c'$ would reach it, and close it by means of the expansion due to heat, and thus the radiator B would still retain a great part of the air and not be sufficiently heated. On the other hand, if the valves C and C′ are arranged as in my device, the valve C will open first and admit the steam, since the pressure on the valve-disk D of the valve C′ will hold it shut until the pressure is equalized, when it will open by means of its spring.

In large apartments it is either inconvenient or impossible to so arrange the pipes which supply the heat that a single valve will serve to shut off the supply and a single valve the return. At the same time it is unnecessary or inconvenient to have more than one thermostat and electrically-actuated valve, which controls the fluid under pressure and for operating the main valves; and hence in my present system I connect all of the various supply and return valves of the pipes which heat the room with one electrically-actuated valve, controlling the supply of air or other fluid under pressure, and use a single thermostat, which automatically actuates said electric valve. By this system the making and breaking of the electric current will operate the entire series of main valves, thereby controlling all of the various sources of heat simultaneously.

It will be understood that in describing the heat, while I have most generally used the term "steam," my present invention is adapted equally as well for hot-air heating.

Having thus described my invention, what I claim as new, and desire to secure by Letters Patent, is—

1. In a system of temperature-regulation, the combination of one thermostat, which serves to control, through the means of a fluid under pressure, the valves which govern the supply of heat to an apartment, with said valves and the fluid under pressure, one of which valves is a supply-valve which shuts against the pressure from the steam-generator, and the other a return-valve which shuts with said pressure, substantially as set forth.

2. In a system of temperature-regulation, the combination of one thermostat, which serves to control, by means of a fluid under pressure, the valves which govern the admission of heat to the apartment in which the thermostat is situated, with an auxiliary valve and the fluid under pressure, and two or more main valves connected with the source of heat, whereby all of the main valves are operated at the same time by means of the one thermostat, substantially as set forth.

3. In a system of temperature-regulation, the combination of a system of heating-pipes having valves operated by a fluid under pressure, a system of pipes containing and conveying said fluid under pressure, an electrically-actuated valve which serves to admit or release the fluid under pressure when it actuates said valves in the heating system, and a suitable electric generator and thermostat in circuit with said electric valve, whereby the thermostat, through the means of the electric valve and the system of pipes containing a fluid under pressure, operates a series of main valves in the heating system, substantially as set forth.

4. In a system of temperature-regulation, the combination of a heat-generator, A, and system of heating-pipes leading therefrom, provided with the supply-valves C and return-valves C′, with the coils or radiators B B, reservoir G, containing fluid under pressure, pipe F and connections, and thermostat I, connected by wires *i i i* with battery J and valve H on the pipe F, substantially as set forth.

In testimony that I claim the foregoing I have hereunto set my hand, at Milwaukee, in the county of Milwaukee and State of Wisconsin, in the presence of two witnesses.

WARREN S. JOHNSON.

Witnesses:
H. G. UNDERWOOD,
ROBERT R. HOSKING.